(12) United States Patent
Yang et al.

(10) Patent No.: US 12,561,273 B2
(45) Date of Patent: Feb. 24, 2026

(54) INFORMATION FEEDBACK METHOD AND SERIAL COMMUNICATION SYSTEM

(71) Applicant: Silergy Semiconductor Technology (Hangzhou) LTD, Zhejiang (CN)

(72) Inventors: Yuanyu Yang, Hangzhou (CN); Xiaoqiang Xu, Hangzhou (CN); Zongquan Zhang, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

(21) Appl. No.: 18/670,894

(22) Filed: May 22, 2024

(65) Prior Publication Data

US 2024/0394213 A1 Nov. 28, 2024

(30) Foreign Application Priority Data

May 26, 2023 (CN) ........................ 202310609377.6

(51) Int. Cl.
*G06F 13/42* (2006.01)

(52) U.S. Cl.
CPC .. *G06F 13/4282* (2013.01); *G06F 2213/0002* (2013.01)

(58) Field of Classification Search
None
See application file for complete search history.

(56) References Cited

U.S. PATENT DOCUMENTS 10,356,824 B2 7/2019 Qiao et al.
2008/0168296 A1* 7/2008 Oh ...................... G06F 13/1689 713/401
2023/0179668 A1 6/2023 Lin et al.
2025/0021513 A1* 1/2025 Yang .................. G06F 13/4282
2025/0024569 A1* 1/2025 Yang ...................... H05B 45/34

FOREIGN PATENT DOCUMENTS

EP 2579512 A1 * 4/2013 ......... H04L 61/5038

* cited by examiner

*Primary Examiner* — Farley Abad
*Assistant Examiner* — Dayton Lewis-Taylor

(57) ABSTRACT

An information feedback method can include: transmitting, by a master device, an instruction to acquire specific information, where each of a plurality of slave devices when receiving the instruction serves as the current slave device; configuring the current slave device in the communication link in the first mode to receive the instruction from the master device or a previous slave device, and forwarding the instruction to a next slave device; connecting input port SDI and output port SDO of the current slave device by controlling the current slave device in the second mode to form a first pathway; determining, by the current slave device, whether the specific information is present in the current slave device to obtain a corresponding determination result; and then selectively configuring, by the current slave device, a potential of the first pathway of the current slave device to be at a first level.

22 Claims, 5 Drawing Sheets

INFORMATION FEEDBACK METHOD AND SERIAL COMMUNICATION SYSTEM

RELATED APPLICATIONS

This application claims the benefit of Chinese Patent Application No. 202310609377.6, filed on May 26, 2023, which is incorporated herein by reference in its entirety.

FIELD OF THE INVENTION

The present invention generally relates to the field of communications, and more particularly, to information feedback methods and serial communication systems.

BACKGROUND

FIG. 1 shows an example serial communication system that includes multiple slave devices and a master device connected in series. Each slave device has at least one input port and at least one output port. The input port of the first slave device can connect to the output port of the master device, and for each of the subsequent slave devices, its input port can connect to the output port of the slave device immediately prior to it. Finally, the output port of the last slave device can connect to the input port of the master device. In this configuration, when a slave device needs to transmit information to the master device, it can do so by using the output port of the last slave device to deliver the information to the input port of the master device. However, in some serial communication systems (see, e.g., FIG. 2), the output port of the last slave device may not be connected to the master device, thus preventing the slave device from providing feedback or transmitting information back to the master device.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
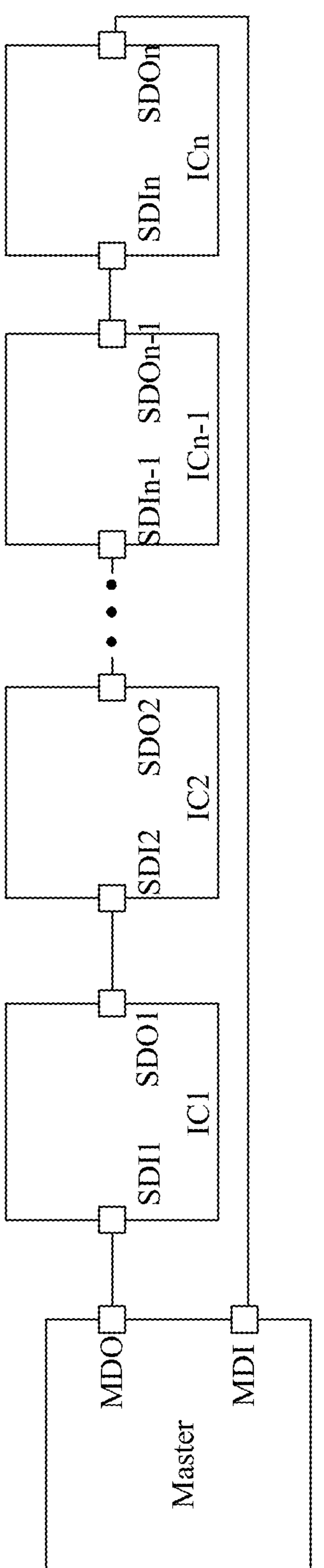
FIG. 1 is a schematic block diagram of an example serial communication system.
Figure 2:
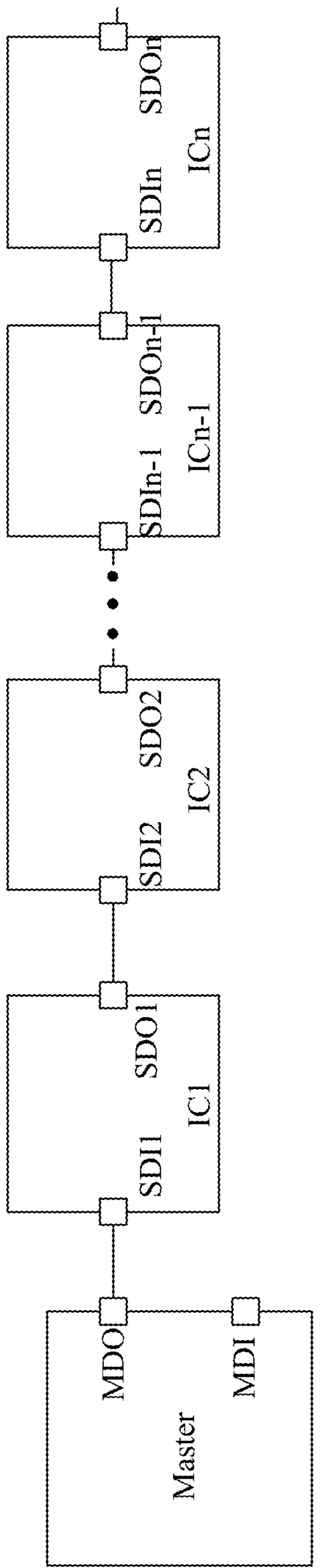
FIG. 2 is a schematic block diagram of another example communication system.
Figure 3:
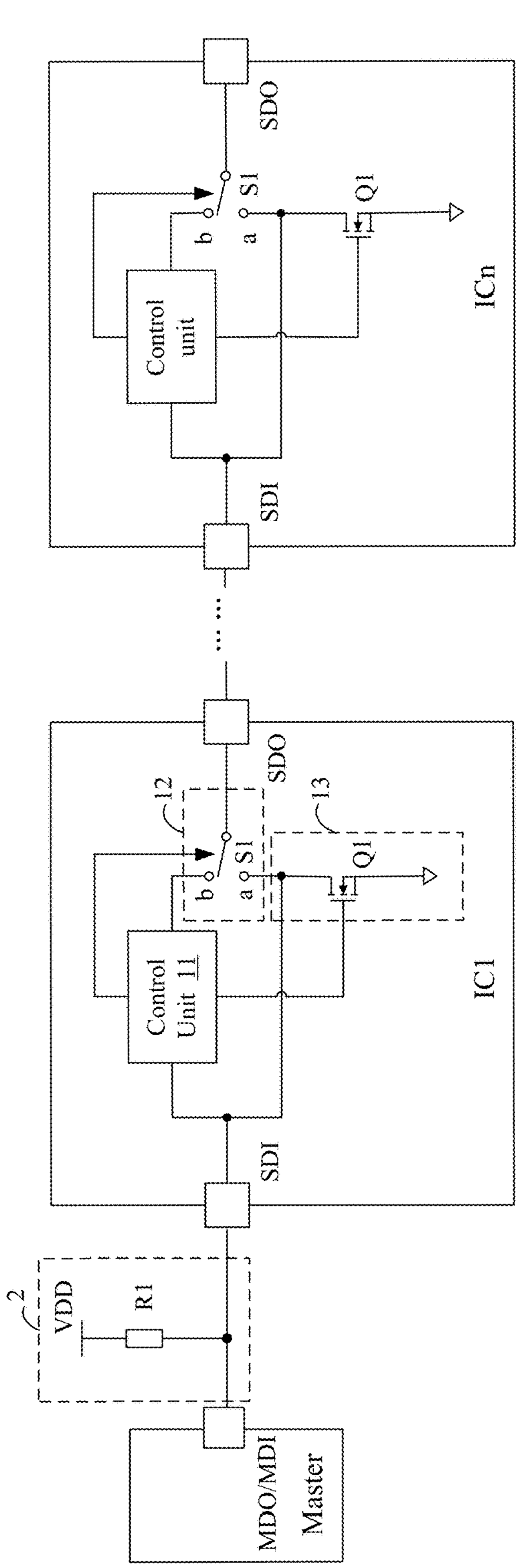
FIG. 3 is a schematic block diagram of a first example serial communication system, in accordance with embodiments of the present invention.

Referring now to FIG. 3, shown is a schematic block diagram of a first example serial communication system, in accordance with embodiments of the present invention. This particular example serial communication system can include a master device and at least one communication link, whereby the master device and each of the at least one communication link are connected in series. The communication link can include "n" slave devices IC1 to ICn connected in series, where n is a positive integer. Each slave device can include at least one input port and at least one output port.

In this example, each slave device can include an input port SDI and an output port SDO. Input port SDI of slave device IC1 can connect to an input-output multiplexing port MDO/MDI of the master device. Input port SDI of each of slave device IC2 to an $n^{th}$ slave device ICn can connect to output port SDO of a slave device immediately prior to it, respectively. Each slave device can include control unit 11 that can forward, or process and then forward, communication packets or commands received by the slave device. The processing of the communication packets can include modifying relevant data in the communication packets. As an example, the master device and n slave devices in the communication link can connect in series via a daisy chain.

When the serial communication system operates in a communication mode, input port SDI of each of a plurality of slave devices may be directly connected to its output port SDO. Thus, the master device can be coupled to each of a plurality of slave devices to perform serial bus communication, and a plurality of slave devices can obtain information or commands sent by the master at the same time. For example, when the serial communication system operates in a communication mode, the master device and a plurality of slave devices can communicate serially to perform chained serial communication. The master device may transmit the communication packets to the plurality of slave devices, and the slave devices operate in a first mode, at which time input port SDI of the slave device can connect to its output port SDO through control unit 11.

When the serial communication system operates in a feedback mode, where each of the plurality of slave devices when receiving the instruction serves as the current slave device, the master device can transmit an instruction to acquire specific information, and the current slave device may receive the instruction. Also, the current slave device may initially operate in the first mode, at which time the instruction received by input port SDI of the current slave device is transmitted to output port SDO of the current slave device through control unit 11, and then the instruction may be transmitted to the next slave device. Then the current slave device can be controlled to operate in a second mode, at which time input port SDI and output port SDO of the current slave device may be directly connected. That is, the current slave device may be in a pass-through state, such that the current slave device can transmit a feedback signal indicating whether the specific information is present in the current slave device to the master device.

When the serial communication system operates in the feedback mode, the serial communication system can adopt an information feedback method to feed the feedback signal back to the master device. The information feedback method can include: transmitting, by the master device, the instruction to acquire the specific information, where each of the plurality of slave devices when receiving the instruction serves as the current slave device; configuring the current slave device in the communication link in the first mode to receive the instruction from the master device or a previous slave device (the one immediately prior to the current slave device), and forwarding the instruction to a next slave device (the one immediately after the current slave device); connecting input port SDI and output port SDO of the current slave device by controlling the current slave device in the second mode to form a first pathway; determining, by the current slave device, whether the specific information is present in the current slave device to obtain a corresponding determination result; and then based on the determination result, selectively configuring, by the current slave device, a potential of the first pathway of the current slave device to be at a first level, such that the master device receives the feedback signal indicating whether the specific information is present in the communication link.

For example, if the determination result shows that the specific information is present in the current slave device, the potential of the first pathway of the current slave device can be at a first level by the current slave device itself. Further, when the potential of the first pathway of at least one slave device is at the first level within a predetermined time threshold, a potential of a linked pathway formed by connecting the first pathways in the communication link in series can be at the first level, such that the master device receives the first level as a first feedback signal. The first feedback signal can indicate that the specific information is present in the communication link. When none of the first pathways of the slave devices is at the first level within the predetermined time threshold, the potential of the linked pathway formed by connecting the first pathways in the communication link in series can be maintained at a second level, such that the master device receives the second level as a second feedback signal. The second feedback signal may indicate that the specific information is not present in the communication link.

Before one of the slave devices whose first pathway is the first to be at the first level (e.g., the first-configured slave device) determines whether the specific information is present in this slave device, an initial potential of the linked pathway formed by connecting the first pathways in the communication link in series can be at the second level, such that the potentials of the first pathways of the slave devices are at the second level. Therefore, for the first-configured slave device, the potential of its first pathway can be changed from the second level to the first level when being configured, and potentials of first pathways of other slave devices whose first pathways are later configured to be at the first level may remain unchanged when the first-configured slave device is being configured. For example, the first-configured slave device is the $i^{th}$ slave device, and the $i^{th}$ slave device initially operates in the first mode to receive the instruction from $i-1^{th}$ slave device and forwards the instruction to the $i+1^{th}$ slave device.

Then, the $i^{th}$ slave device can be controlled to operate in the second mode to connect its own input port SDI and output port SDO, in order to form the first pathway of the $i^{th}$ slave device. At this time, since the linked pathway formed by connecting the first pathways of the first slave device to the $i^{th}$ slave device in series can be at the second level, the potential of the first pathway of the $i^{th}$ slave device can be at the second level. The $i^{th}$ slave device can determine whether the specific information is present in itself to obtain the corresponding determination result. If the determination result shows that the specific information is present in the $i^{th}$ slave device, the potential of the first pathway of the $i^{th}$ slave device can be at a first level. That is, the potential of the first pathway of the $i^{th}$ slave device can change from the second level to the first level, and the potential of the linked pathway formed by connecting the first pathways of the first slave device to the $i^{th}$ slave device in series can be at the first level, such that the master device receives the first level as the first feedback signal.

As an example, when the master device has received the first level as the first feedback signal, the processes of forwarding the instruction and determining whether the specific information is present in the slave devices can continue. That is, the $i+1^{th}$ slave device may receive the instruction and then transmit the instruction to the $i+2^{th}$ slave device. Also, the $i+1^{th}$ slave device may determine whether the specific information is present in itself, but the determination results from the $i+1^{th}$ slave device to the $n^{th}$ slave device may not influence the feedback signal. As another example, the processes of forwarding the instruction and determining whether the specific information is present in the slave devices can stop after the potential of the linked pathway is at the first level by the $i^{th}$ slave device (e.g., when the master device has received the first level as the first feedback signal).

For example, each slave device can also include a mode selection circuit 12. A first end of mode selection circuit 12 can connect to input port SDI of the corresponding slave device, a second end of mode selection circuit 12 can selectively connect to output port SDO of the corresponding slave device or a first end of control unit 11, and a second end of control unit 11 can connect to output port SDO of the corresponding slave device. As another example, the first end of mode selection circuit 12 can connect to output port SDO of the corresponding slave device, the second end of mode selection circuit 12 can selectively connect to input port SDI of the corresponding slave device or the first end of control unit 11, and the second end of control unit 11 can connect to input port SDI of the corresponding slave device. Mode selection circuit 12 can be controlled by control unit 11, in order to control the corresponding slave device to operate in the first mode or the second mode.

When the serial communication system operates in the feedback mode, the master device can transmit the instruction to acquire the specific information. Also, control unit 11 can control mode selection circuit 12 such that the second end of mode selection circuit 12 can connect to the first end of control unit 11 and the current slave device may operate in the first mode. At this time, the instruction received by input port SDI of the current slave device can be transmitted to output port SDO of the current slave device through control unit 11, and then the instruction may be transmitted to the next slave device. Next, control unit 11 can control mode selection circuit 12 such that the second end of mode selection circuit 12 can connect to the corresponding input/output ports of the current slave device, and the current slave device may operate in the second mode. At this time, input port SDI and output port SDO of the current slave device can be connected, in order to provide the feedback signal to the master device.

For example, for each slave device, the current slave device initially operates in the first mode, at which time the instruction received by input port SDI of the slave device can be transmitted to output port SDO of the slave device through control unit 11. After receiving and transmitting the instruction by the slave device, control unit 11 can control the current slave device to operate in the second mode. For example, control unit 11 can control mode selection circuit 12 to connect input port SDI and output port SDO of the current slave device to form the first pathway. Then, the current slave device may determine whether the specific information is present in itself and obtain a corresponding determination result. Then, the current slave device may selectively configure the potential of its first pathway to be at the first level based on the determination result.

When the slave device fails to receive the instruction, or when the current slave device receives the instruction but does not transmit the instruction, control unit 11 can control mode selection circuit 12 to connect input port SDI of the current slave device to output port SDO of the current slave device through control unit 11, and the current slave device may remain in the first mode. Further, after the instruction is transmitted from the master device, the master device can acquire the feedback signal indicating whether the specific information is present in the slave devices through the above information feedback method during a first time. When the first time is greater than the predetermined time threshold (e.g., a duration for the master device to receive the feedback signal from the slave devices is greater than the predetermined time threshold), the slave device can be controlled to exit the second mode and operate in the first mode, and the serial communication system may exit the feedback mode.

For example, when the serial communication system operates in the communication mode, control unit 11 can control the slave device to continue operating in the first mode. At this time, control unit 11 can control mode selection circuit 12 to connect input port SDI of the slave device to output port SDO of the slave device through control unit 11. As another example, when the serial communication system operates in the communication mode, control unit 11 can control the slave device to keep operating in the second mode, at which time control unit 11 can control mode selection circuit 12 to directly connect input port SDI of the slave device to output port SDO of the slave device.

For example, mode selection circuit 12 can include a selection switch S1. A first end of selection switch S1 can connect to output port SDO of the corresponding slave device, a second end of selection switch S1 may selectively connect to input port SDI of the corresponding slave device or the first end of control unit 11, and the second end of control unit 11 can connect to input port SDI of the corresponding slave device. For example, after receiving and transmitting the instruction by the current slave device, control unit 11 can control selection switch S1 to switch to Node a, and Node a can connect to input port SDI of the current slave device, such that input port SDI and output port SDO of the current slave device are connected directly, and the current slave device may operate in the second mode.

When the current slave device fails to receive the instruction, or when the current slave device receives the instruction but does not transmit the instruction, control unit 11 can control selection switch S1 to remain connected to Node b, and Node b can connect to the first end of control unit 11, such that input port SDI of the current slave device can connect to output port SDO of the current slave device through control unit 11, and the current slave device may operate in the first mode. In other examples, the first end of selection switch S1 can connect to input port SDI of the current slave device, the second end of selection switch S1 can selectively connect to output port SDO of the current slave device or the first end of control unit 11, and the second end of control unit 11 can connect to output port SDO of the current slave device.

As an example, the serial communication system can also include a pull-up circuit 2, which can connect between a power supply VDD and any node of the master device and the first slave device among the plurality of slave devices. The pull-up circuit 2 can pull up the initial potential of the linked pathway to a high level (e.g., the second level) within the predetermined time threshold, and the first level can be at a low level. As an example, the serial communication system may only include one pull-up circuit 2, which can connect between power supply VDD and any node of the master device and the first slave device. As another example, the pull-up circuit 2 can be disposed inside the master device. For example, the pull-up circuit 2 can connect between power supply VDD and a node connected to input-output multiplexing port MDI/MDO of the master device. In another example, the serial communication system can include a plurality of pull-up circuits 2, and each of the pull-up circuits 2 can connect between power supply VDD and a node in the first pathway. For example, each pull-up circuit 2 may include resistor R1, while in other examples, each pull-up circuit 2 may include a power switch or a current source.

Further, each of the slave devices can include a pull-down unit 13, which can connect between a ground potential and any node in the first pathway of the corresponding slave device, and can be controlled by control unit 11. If a corresponding determination result shows that the specific information is present in the corresponding slave device, pull-down unit 13 can be controlled by control unit 11 to pull down the potential of the first pathway of the corresponding slave device to the first level (e.g., the low level), such that the potential of the linked pathway is pulled down to the low level, and the master device receives the low level as the first feedback signal. The first feedback signal may indicate that the specific information is present in the communication link. As one particular example, the first level can be at the low level, and the second level can be at the high level.

For example, the pull-down unit 13 can include power switch Q1, which can connect between input port SDI of the corresponding slave device and the ground potential and can be controlled by control unit 11. If a corresponding determination result shows that the specific information is present in the corresponding slave device, power switch Q1 can be turned on to pull down the potential of the first pathway to zero (e.g., a low level). Otherwise, power switch Q1 can be turned off, and the potential of the first pathway is maintained at the high level. In other examples, power switch Q1 can connect between output port SDO of the corresponding slave device and the ground potential.

As another example, the pull-down unit 13 can include a first current source, which can connect between any node in the first pathway of the corresponding slave device and the ground potential. If a corresponding determination result shows that the specific information is present in the corresponding slave device, the first current source may operate to pull down the potential of the first pathway to zero. Otherwise, the first current source can be disabled and the potential of the first pathway maintained at the high level. For example, a first power end of power switch Q1 can connect to input port SDI of the corresponding slave device, a second power end of power switch Q1 can connect to the ground potential, and a control end of the first power switch can connect to control unit 11. Also, a common end of power switch Q1 and input port SDI can connect to Node a.

As an example, when the master device needs to acquire the specific information from the slave devices, input/output multiplexing port MDO/MDI of the master device can be configured in an output mode, and the master device may transmit the instruction. After the instruction is transmitted by the master device, input/output multiplexing port MDO/MDI of the master device can be configured in an input mode. After the instruction is received and transmitted by the first slave device, control unit 11 can control selection switch S1 to switch to the Node a, and input port SDI and output port SDO of the first slave device can directly connect to form the first pathway, at which time, the first pathway may be configured at the high level. Also, a linked pathway from input-output multiplexing port MDO/MDI of the master device to output port SDO of slave device IC1 may also be configured at the high level. Control unit 11 can determine whether the specific information is present in the first slave device and selectively turn power switch Q1 on or off.

For example, if control unit 11 of the first slave device determines that the specific information is present in the first slave device, power switch Q1 can be turned on, and the potential of the first pathway may be pulled down to the low level, such that the linked pathway from input-output multiplexing port MDO/MDI of the master device to output port SDO of slave device IC1 is configured at the low level, and input-output multiplexing port MDO/MDI of the master device is configured at the low level. As such, the master device may receive the low level as the feedback signal, indicating that the specific information is present in the communication link.

The second to $n^{th}$ slave devices can repeat the above processes in sequence. When the potential of the first pathway of at least one slave device is pulled down to the first level (low level) within the predetermined time threshold, the master device may receive the low level as the first feedback signal, and the first feedback signal can indicate that the specific information is present in the communication link. When none of the first pathways is pulled down to the first level within the predetermined time threshold, the potential of the linked pathway formed by connecting the first pathways in the communication link in series can be maintained at the high level, and the master device may receive the high level as the second feedback signal, whereby the second feedback signal indicates that the specific information is not present in the communication link.

As an example, the master device can include input-output multiplexing port MDO/MDI, and can transmit the instruction to acquire the specific information and receive the feedback signal from the plurality of slave devices. As another example, the master device can include an output port and an input port, whereby the output port is configured to transmit the instruction, and the input port is configured to receive the feedback signal from the slave devices. The input port and the output port of the master device can both be connected to the input port of the first slave device, and the output port of the master device can be configured to be in a high-resistance state after the master device transmits the instruction. The specific information can include simple information that does not need to be specifically localized to a particular communication link and/or a particular slave device, such as information indicating an insufficient supply voltage or error reporting information.

In particular embodiments, the specific information can include information such as there exist errors of the slave devices to be reported. After the master device transmits the instruction to acquire the errors, if the errors are present in the salve device in the communication link within the predetermined time threshold, control unit 11 of the current slave device can control the pull-down unit 13 to pull down the potential of the first pathway of the current slave device to the low level as the first level. As such, the potential of the linked pathway formed by connecting the first pathways of the plurality of slave devices in series can be at the first level, and the master device may receive the first level as the first feedback signal, which can indicate that the errors to be reported are present in the salve device in the communication link. The master device may perform a next operation accordingly, such as stopping communicating with the slave devices in the communication link. Conversely, if none of the first pathways of the plurality of slave devices are at the first level within the predetermined time threshold, the potential of the linked pathway formed by connecting the first pathways of the plurality of slave devices in series can be maintained at the second level (e.g., high level), and the master device may receive the second level as the second feedback signal, which can indicate that the errors to be reported are not present in the salve device in the communication link.

In particular embodiments, each of the plurality of slave devices can be configured to drive a plurality of light-emitting diode (LED) strings. For example, the specific information can include information indicating that a supply voltage of the plurality of LED strings is insufficient. In one example, the supply voltage of the plurality of LED strings can increase when the first feedback signal indicating that the specific information is present in the salve device in the communication link is received by the master device.

Figure 4:
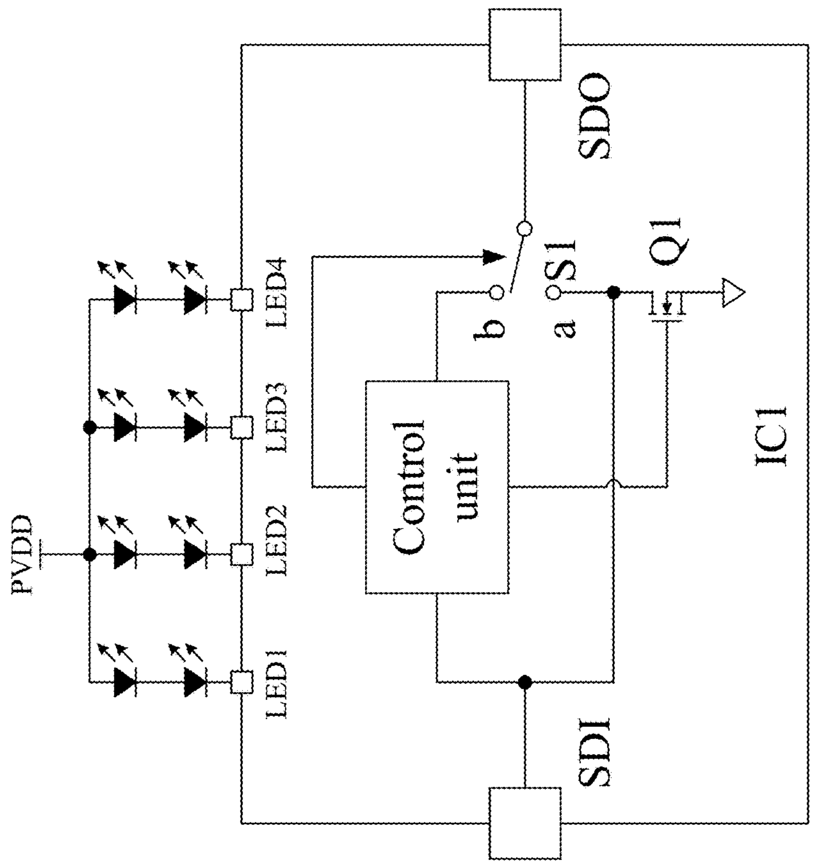
FIG. 4 is a schematic block diagram of an example slave device in the serial communication system, in accordance with embodiments of the present invention.

Referring now to FIG. 4, shown is a schematic block diagram of an example slave device in the serial communication system, in accordance with embodiments of the present invention. In this particular example, the slave device can drive four LED strings: LED1, LED2, LED3, and LED4. Here, the first information can include that a cathode voltage of the cathode of one of the LED strings is less than a first threshold. After the master device transmits the instruction to acquire the first information indicating that the cathode voltage of the cathode of the LED string is less than the first threshold, if the cathode voltage of at least one of the LED strings is less than the first threshold within the predetermined time threshold, power switch Q1 can turn on. Also, the potential of the first pathway of the current slave device may be pulled down to the low level as the first level, such that the potential of the linked pathway formed by connecting the first pathways of the slave devices in series can be at the first level. Further, the master device may receive the first level as the first feedback signal, indicating that the cathode voltage of the LED string being less than the first threshold is present in the slave device in the communication link. Also, the master device may obtain specific information indicating that the supply voltage of the LED strings is insufficient, and then increases the supply voltage of the LED strings.

Conversely, if cathode voltages of LED strings of all slave devices are greater than the first threshold, and none of the potential of the first pathways of the plurality of slave devices is at the first level within the predetermined time threshold, the potential of the linked pathway formed by connecting the first pathways of the slave devices in series can be at the second level (e.g., high level). Also, the master device may receive the second level as the second feedback signal, indicating that none of the cathode voltages of LED strings of the slave devices in the communication link is less than the first threshold, and the master device accordingly may not adjust the supply voltage. As an example, output port SDO of the last slave device may not be connected to the master device. In another example, output port SDO of the last slave device can connect to the master device and adopt the above information feedback method.

In one example, the serial communication system can include master device and one communication link connected in series. As another example, the serial communication system can include one master device and N communication links, and the master device and each of N communication links can connect in series, whereby N is a positive integer. The number of slave devices in each communication link may be the same or different, and each communication link can correspond to one multiplexing port of the master device. That is, the N communication links can correspond to N input-output multiplexing ports of the master device, respectively, and a first slave device among the plurality of slave devices in each communication link can connect to the corresponding input-output multiplexing port of the master device. As yet another example, the serial communication system can include one master device and N communication links, and the master device and each of N communication links can connect in series. The number of slave devices in each communication link may be the same or different, and the N communication links can correspond to a same input-output multiplexing port of the master device.

The N communication links in the above two serial communication systems may all feedback the information to the master device in accordance with the above feedback approach. When one of the plurality of slave devices of one communication link determines that the specific information is present in the slave device, the master device may receive the first level as the first feedback signal, which can indicate that the specific information is present in the communication link. When all the slave devices of the communication links determine that the specific information is not present therein, the master device may receive the second level as the second feedback signal, which can indicate that the specific information is not present in the communication link.

For example, each of the plurality of slave devices in the serial communication system can include one input port and one output port for single-wire communication. As another example, each slave device may include two input ports and two output ports, while one of the input ports is configured to receive a clock signal and one of the output ports is configured to output the clock signal for other communication (e.g., $I^2C$ communication).

Figure 5:
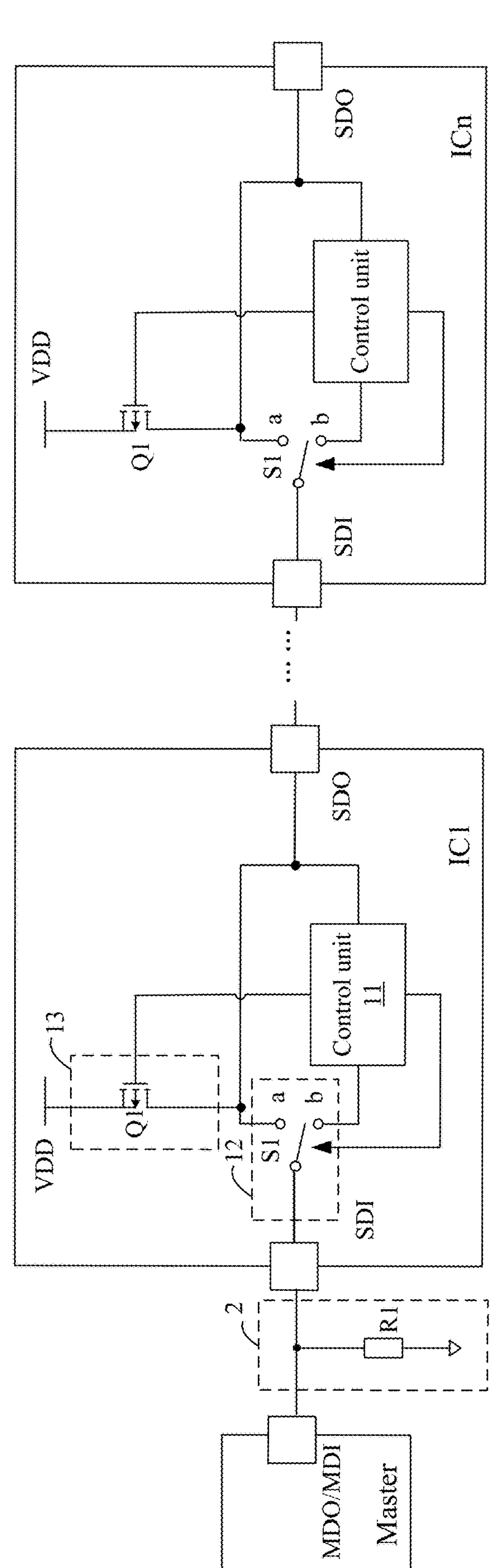
FIG. 5 is a schematic block diagram of a second example serial communication system, in accordance with embodiments of the present invention.

Referring now to FIG. 5, shown is a schematic block diagram of a second example serial communication system, in accordance with embodiments of the present invention. In this particular example, the first level can be at the high level, the second level can be at the low level, the pull-up circuit and the pull-down circuit may have different positions and structures from the examples above, and mode selection circuit 12 may also have a different position from the above examples.

In this particular example, the serial communication system can include a pull-down circuit 2, which can be configured to pull down the potential of the linked pathway to the second level within the predetermined time threshold. For example, pull-down circuit 2 can connect between the ground potential and any node of the master device and input port SDI of the first slave device. As another example, pull-down circuit 2 can be disposed inside the master device. For example, pull-down circuit 2 can connect between the ground potential and the node connected to the input-output multiplexing port MDI/MDO of the master device. In other examples, the serial communication system can include a plurality of pull-down circuits 2. That is, each of the slave devices can correspond to one of the pull-down circuits 2, and each of the pull-down circuits 2 can connect between any node in the first pathway of the corresponding slave device and the ground potential. For example, pull-down circuit 2 can include resistor R1, while in other examples, pull-down circuit 2 may include a power switch or a current source.

For example, each of the slave devices can include a pull-up unit 13, which can connect between the power supply VDD and any node of the first pathway of the corresponding slave device, and may be controlled by control unit 11. If the corresponding slave device determines that specific information is present in itself, control unit 11 can control the pull-up unit 13 to pull up the potential of the first pathway of the corresponding slave device to the high level as the first level. As such, the potential of the linked pathway can be pulled up to the high level, and the master device may receive the high level as the first feedback signal, which can indicate that the specific information is present in at least one slave device in the communication link. As an example, pull-up unit 13 can include power switch Q1, which can connect between any node in the first pathway of the corresponding slave device and power supply VDD. If the corresponding slave device determines that the specific information is present in itself, the corresponding slave device can turn on switch Q1 to pull up the potential of the first pathway of the corresponding slave device to the high level. Otherwise, the corresponding slave device may turn off power switch Q1, and the potential of the first pathway of the corresponding slave device can be maintained at the low level.

As another example, the pull-up unit can include a first current source, which can connect between any node of the first pathway of the corresponding slave device and power supply VDD. If the corresponding slave device determines that the specific information is present in itself, the corresponding slave device can control the first current source to operate to pull up the potential of the first pathway of the corresponding slave device to the high level. Otherwise, the first current source can be disabled and the potential of the first pathway of the corresponding slave device maintained at the low level. When none of first pathways of the plurality of slave devices is at the high level within the predetermined time threshold, the master device may receive the low level as the second feedback signal, which can indicate that the specific information is not present in the slave device in the communication link. Mode selection circuit 12 can include selection switch S1. For example, a first end of selection switch S1 can connect to input port SDI of the corresponding slave device, and a second end of selection switch S1 may selectively be connected to output port SDO of the corresponding slave device or the first end of control unit 11. The second end of control unit 11 can connect to output port SDO of the corresponding slave device.

It should be noted that one of the high level and the low level can be configured as the first level, and the other one of the high level and the low level configured as the second level in particular embodiments, while in other examples, the first level and the second level may be configured to be a specific number (e.g., 5V and 3V, respectively).

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. An information feedback method for a serial communication system, the serial communication system comprising a master device and at least one communication link, the master and each communication link being connected in series, each communication link comprising a plurality of slave devices connected in series, wherein each slave device comprises an input port and an output port, the method comprising:

a) transmitting, by the master device, an instruction to acquire specific information, wherein each of the plurality of slave devices when receiving the instruction serves as a current slave device;

b) configuring the current slave device in the communication link in a first mode to receive the instruction from the master device or a previous slave device, and forwarding the instruction to a subsequent slave device;

c) connecting an input port and an output port of the current slave device by controlling the current slave device in a second mode that is a pass-through state to form a first pathway;

d) determining, by the current slave device, whether the specific information is present in the current slave device to obtain a corresponding determination result;

e) based on the determination result, selectively configuring, by the current slave device, a potential of the first pathway of the current slave device to be at a first level, such that the master device receives a feedback signal indicating whether the specific information is present in the slave device in the communication link; and f) wherein each of the plurality of slave devices further comprises a control unit, wherein when one of the plurality of slave devices is in the first mode, the input port and the output port of the slave device are connected through the control unit, and wherein when one of the plurality of slave devices is in the second mode, the input port and the output port of the slave device are directly connected.

2. The method of claim 1, wherein when the determination result shows that the specific information is present in the current slave device, configuring the potential of the first pathway of the current slave device to be at the first level.

3. The method of claim 1, wherein when a potential of a first pathway of one of the plurality of slave devices is configured to be at the first level within a predetermined time threshold, configuring a potential of a linked pathway formed by connecting a plurality of first pathways of the communication link in series to be at the first level, such that the master device receives the first level as a first feedback signal, wherein the first feedback signal indicates that the specific information is present in the slave device in the communication link.

4. The method of claim 1, wherein when none of first pathways of the plurality of slave devices is configured to be at the first level within a predetermined time threshold, configuring a potential of a linked pathway formed by connecting the first pathways of the plurality of slave devices in series to be maintained at a second level, such that the master device receives the second level as a second feedback signal, wherein the second feedback signal indicates that the specific information is not present in the slave device in the communication link.

5. The method of claim 1, wherein before determining, by one of the plurality of slave devices whose first pathway is the first to be configured to be at the first level, whether the specific information is present in the slave device, configuring an initial potential of a linked pathway formed by connecting a plurality of first pathways of the communication link in series to be at a second level, such that the potential of the first pathway of the slave device is configured to be at the second level.

6. The method of claim 1, wherein when the serial communication system operates in a communication mode, the slave device continuously operates in either the first mode or the second mode.

7. The method of claim 1, wherein when the serial communication system operates in a feedback mode, the current slave device initially operates in the first mode to transmit the instruction to the subsequent slave device, and then the current slave device is controlled to operate in the second mode to feed the feedback signal back to the master device.

8. The method of claim 1, wherein the serial communication system further comprises a pull-up circuit that is configured to set an initial potential of a linked pathway formed by connecting a plurality of first pathways of the communication link in series to be at a second level within a predetermined time threshold, wherein the second level is configured to be at a high level, and the first level is configured to be at a low level.

9. The method of claim 8, wherein:

a) each of the plurality of slave devices further comprises a pull-down unit that is connected between any node in the first pathway of the corresponding slave device and a ground potential;

b) when the determination result shows that the specific information is present in the corresponding slave device, the pull-down unit is controlled to pull down the potential of the first pathway of the corresponding slave device to the first level, such that a potential of the linked pathway is pulled down from the high level to the low level, and the master device receives the low level as a first feedback signal; and c) the first feedback signal indicates that the specific information is present in the slave device in the communication link.

10. The method of claim 9, wherein:

a) the pull-down unit comprises a first power switch that is connected between any node in the first pathway of the corresponding slave device and the ground potential; and b) when the determination result shows that the specific information is present in the corresponding slave device, the first power switch is turned on to pull down the potential of the first pathway to the low level.

11. The method of claim 9, wherein:

a) the first current source is connected between any node in the first pathway of the corresponding slave device and the ground potential; and b) when the determination result shows that the specific information is present in the corresponding slave device, the first current source operates to pull down the potential of the first pathway to the low level.

12. The method of claim 1, wherein the serial communication system further comprises a pull-down circuit, being configured to set an initial potential of a linked pathway formed by connecting a plurality of first pathways of the communication link in series to be at a second level within a predetermined time threshold, wherein the second level is configured to be at a low level, and the first level is configured to be at a high level.

13. The method of claim 12, wherein:

a) each of the plurality of slave devices further comprises a pull-up unit that is connected between any node in the first pathway of the corresponding slave device and a power supply;

b) when the determination result shows that the specific information is present in the corresponding slave device, the pull-up unit is controlled to pull up the potential of the first pathway of the slave device to the first level, such that a potential of the linked pathway is pulled up from the low level to the high level, and the master device receives the high level as a first feedback signal; and c) the first feedback signal indicates that the specific information is present in the slave device in the communication link.

14. The method of claim 13, wherein:

a) the pull-up unit comprises a first power switch that is connected between any node in the first pathway of the corresponding slave device and the power supply; and b) when the determination result shows that the specific information is present in the corresponding slave device, the first power switch is turned on to pull up the potential of the first pathway to the high level.

15. The method of claim 13, wherein:

a) the pull-up unit comprises a first current source that is connected between any node in the first pathway of the corresponding slave device and the power supply; and b) when the determination result shows that the specific information is present in the corresponding slave device, the first current source operates to pull up the potential of the first pathway to the high level.

16. The method of claim 1, wherein:

a) each of the plurality of slave devices further comprises a mode selection circuit and a control unit;

b) a first end of the mode selection circuit is connected to the input port of the corresponding slave device, a second end of the mode selection circuit is selectively connected to the output port of the corresponding slave device or a first end of the control unit, and a second end of the control unit is connected to the output port of the corresponding slave device; and c) the mode selection circuit is controlled by the control unit to control the slave device to operate in the first mode or the second mode.

17. The method of claim 1, wherein:

a) each of the plurality of slave devices further comprises a mode selection circuit and a control unit;

b) a first end of the mode selection circuit is connected to the output port of the corresponding slave device, a second end of the mode selection circuit is selectively connected to the input port of the corresponding slave device or a first end of the control unit, and a second end of the control unit is connected to the input port of the corresponding slave device; and c) the mode selection circuit is controlled by the control unit to control the slave device to operate in the first mode or the second mode.

18. The method of claim 1, wherein the master device comprises an output port and an input port, wherein the output port is configured to transmit the instruction, and the input port is configured to receive the feedback signal from the slave device, and wherein the input port and the output port of the master device are both connected to an input port of a first slave device among the plurality of slave devices.

19. The method of claim 1, wherein the specific information comprises errors to be reported by the slave device, or wherein each of the plurality of slave devices is configured to drive a plurality of LED strings, and the specific information comprises first information indicating that a supply voltage of the plurality of LED strings is insufficient.

20. The method of claim 1, wherein an output port of a last slave device among the plurality of slave devices is not connected to the master device or an output port of a last slave device among the plurality of slave devices is connected to the master device.

21. An information feedback method for a serial communication system, the serial communication system comprising a master device and at least one communication link, the master and each communication link being connected in series, each communication link comprising a plurality of slave devices connected in series, wherein each slave device comprises an input port and an output port, the method comprising:

a) transmitting, by the master device, an instruction to acquire specific information, wherein each of the plurality of slave devices when receiving the instruction serves as a current slave device;

b) configuring the current slave device in the communication link in a first mode to receive the instruction from the master device or a previous slave device, and forwarding the instruction to a subsequent slave device;

c) connecting an input port and an output port of the current slave device by controlling the current slave device in a second mode that is a pass-through state to form a first pathway;

d) determining, by the current slave device, whether the specific information is present in the current slave device to obtain a corresponding determination result;

e) based on the determination result, selectively configuring, by the current slave device, a potential of the first pathway of the current slave device to be at a first level, such that the master device receives a feedback signal indicating whether the specific information is present in the slave device in the communication link;

f) wherein the master device transmits the instruction to acquire the specific information and then receives the feedback signal from the slave devices; and g) wherein when a duration for the master device to receive the feedback signal from the slave devices is greater than a predetermined time threshold, the slave device is controlled to exit the second mode and operate in the first mode.

22. An information feedback method for a serial communication system, the serial communication system comprising a master device and at least one communication link, the master and each communication link being connected in series, each communication link comprising a plurality of slave devices connected in series, wherein each slave device comprises an input port and an output port, the method comprising:

a) transmitting, by the master device, an instruction to acquire specific information, wherein each of the plurality of slave devices when receiving the instruction serves as a current slave device;

b) configuring the current slave device in the communication link in a first mode to receive the instruction from the master device or a previous slave device, and forwarding the instruction to a subsequent slave device;

c) connecting an input port and an output port of the current slave device by controlling the current slave device in a second mode that is a pass-through state to form a first pathway;

d) determining, by the current slave device, whether the specific information is present in the current slave device to obtain a corresponding determination result;

e) based on the determination result, selectively configuring, by the current slave device, a potential of the first pathway of the current slave device to be at a first level, such that the master device receives a feedback signal indicating whether the specific information is present in the slave device in the communication link; and f) wherein the master device comprises an input-output multiplexing port that is configured to transmit the instruction and receive the feedback signal from the slave device.

* * * * *